(12) United States Patent
Shei et al.

(10) Patent No.: US 9,733,422 B2
(45) Date of Patent: Aug. 15, 2017

(54) REFLECTIVE DISPLAY APPARATUS

(71) Applicant: E Ink Holdings Inc., Hsinchu (TW)

(72) Inventors: Tsai-Wei Shei, Hsinchu (TW); I-Jeng Chen, Hsinchu (TW); Hsin-Tao Huang, Hsinchu (TW); Yu-Nan Pao, Hsinchu (TW); Sheng-Chieh Tai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 112 days.

(21) Appl. No.: 14/806,630

(22) Filed: Jul. 22, 2015

(65) Prior Publication Data

US 2016/0299284 A1    Oct. 13, 2016

(30) Foreign Application Priority Data

Apr. 10, 2015  (TW) .............................. 104111659 A

(51) Int. Cl.
*F21V 8/00* (2006.01)
(52) U.S. Cl.
CPC ......... *G02B 6/0088* (2013.01); *G02B 6/0065* (2013.01)
(58) Field of Classification Search
CPC ............................ G02B 6/0088; G02B 6/0065
See application file for complete search history.

(56) References Cited

U.S. PATENT DOCUMENTS

| | | | | |
|---|---|---|---|---|
| 6,847,424 B2 * | 1/2005 | Gotoh | ............... | G02F 1/133615 349/113 |
| 7,388,569 B2 * | 6/2008 | Agari | .................... | G02F 1/1336 345/102 |
| 8,310,649 B2 | 11/2012 | Niiyama et al. | | |
| 8,586,171 B2 | 11/2013 | Kim | | |
| 8,704,971 B2 | 4/2014 | Nishi et al. | | |
| 2001/0028419 A1 | 10/2001 | Fukiharu | | |
| 2011/0122628 A1 | 5/2011 | Han | | |
| 2011/0228191 A1* | 9/2011 | Hsu | ..................... | G02F 1/13338 349/58 |

FOREIGN PATENT DOCUMENTS

| | | |
|---|---|---|
| JP | 2003075833 A | 3/2003 |
| JP | 2003161940 A | 6/2003 |
| JP | 2008286860 A | 11/2008 |
| TW | 531666 B | 5/2003 |
| TW | I296728 B | 5/2008 |
| TW | M352038 U | 3/2009 |
| TW | 201241505 A | 10/2012 |

OTHER PUBLICATIONS

Senbonmatsu et al., Japanese Patent Application Publication 2003-161940,Jun. 2003, machine translation.*
Corresponding Taiwanese Office Action that these art references were cited on Feb. 15, 2016.

* cited by examiner

*Primary Examiner* — Tracie Y Green
(74) *Attorney, Agent, or Firm* — CKC & Partners Co., Ltd.

(57) ABSTRACT

A reflective display apparatus includes a reflective display panel, a light guide plate, an elastic ring, a light permeable liquid and a holding device. The elastic ring is sandwiched between the reflective display panel and the light guide plate, and it spaces the reflective display panel and the light guide plate apart defines a space between the reflective display panel and the light guide plate. The light permeable liquid is located in the space. The holding device holds the reflective display panel and the light guide plate, thereby pressing against the elastic ring and making the elastic ring deform.

10 Claims, 5 Drawing Sheets

REFLECTIVE DISPLAY APPARATUS

RELATED APPLICATIONS

This application claims priority to Taiwanese Application Serial Number 104111659, filed Apr. 10, 2015, which is herein incorporated by reference.

BACKGROUND

Technical Field

Embodiments of the present invention relate to a display apparatus. More particularly, embodiments of the present invention relate to a reflective display apparatus.

Description of Related Art

A reflective display apparatus requires ambient light and a reflective display apparatus cannot clearly show an image if the ambient light fades. Take a large-sized reflective display apparatus such as an outdoor billboard for example, this reflective display apparatus cannot clearly show an image at night due to the insufficient ambient light.

In order to address this issue, a wall washer lamp can be placed in front of the reflective display apparatus, so as to emit a light toward the reflective display apparatus, thereby displaying an image. However, the light distribution that the wall washer lamp emits toward the reflective display apparatus is quite non-uniform which causes significant bright zones and dark zones which may appear on the reflective display apparatus.

SUMMARY

Embodiments of the present invention make the reflective display apparatus still clearly show an image when the ambient light is insufficient.

In accordance with one embodiment of the present invention, a reflective display apparatus includes a reflective display panel, a light guide plate, an elastic ring, a light permeable liquid and a holding device. The elastic ring is sandwiched between the reflective display panel and the light guide plate. The elastic ring spaces the reflective display panel and the light guide plate apart. The elastic ring defines a space between the reflective display panel and the light guide plate. The light permeable liquid is located in the space. The holding device holds the reflective display panel and the light guide plate, thereby pressing against the elastic ring and making the elastic ring deform.

In the foregoing embodiment, because the light permeable liquid and the light guide plate are located above the reflective display panel, the light guide plate and the light permeable liquid allow the lights to travel into the reflective display panel uniformly, thereby clearly displaying the image.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 5 is a schematic cross-sectional view of a reflective display apparatus in accordance with another embodiment of the present invent on.

DETAILED DESCRIPTION

Figure 1:
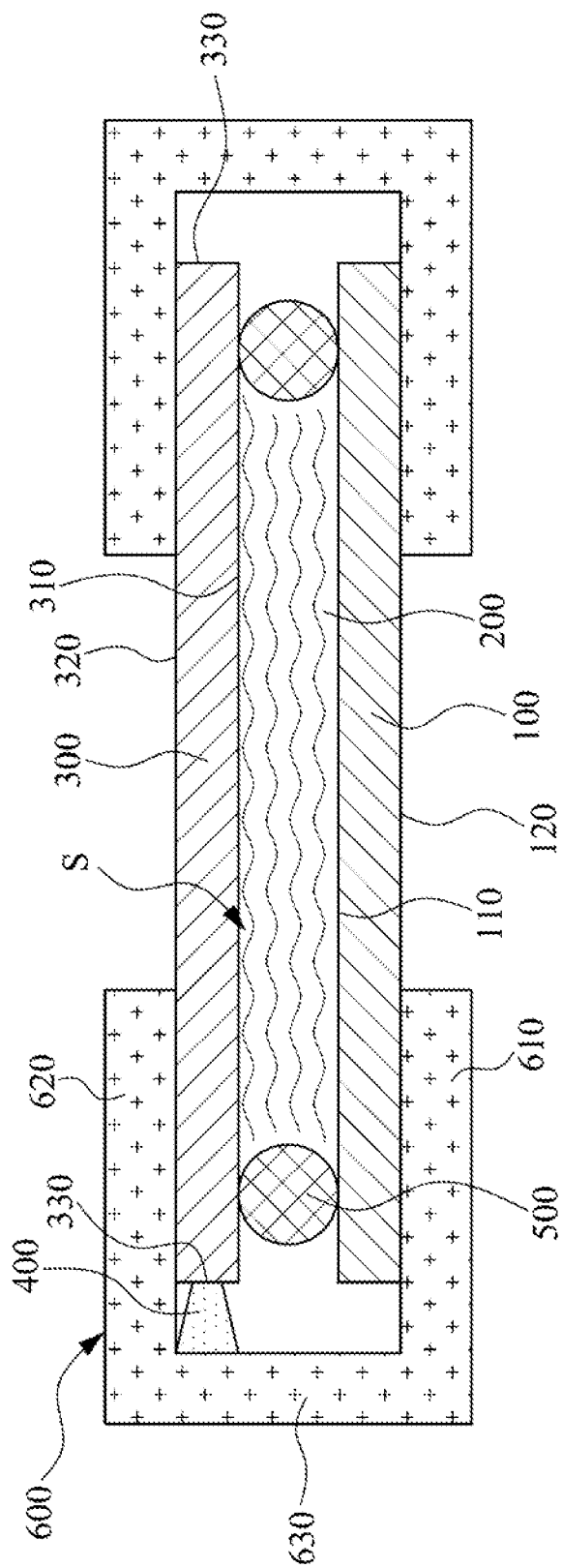
FIG. 1 is a schematic cross-sectional view of a reflective display apparatus in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic cross-sectional view of a reflective display apparatus in accordance with one embodiment of the present invention. As shown in FIG. 1 in this embodiment, the reflective display apparatus includes a reflective display panel 100, a light permeable liquid 200, a light guide plate 300, a light source 400, an elastic ring 500 and a holding device 600. The light source 400 is located between the holding device 600 and the light guide plate 300, so as to provide a light to the light guide plate 300. The elastic ring 500 is sandwiched between the reflective display panel 100 and the light guide plate 300. The elastic ring 500 spaces the reflective display panel 100 and the light guide plate 300 apart. The elastic ring 500 defines a space S between the reflective display panel 100 and the light guide plate 300. The light permeable liquid 200 is located in the space. The holding device 600 holds the reflective display panel 100 and the light guide plate 300, thereby pressing against the elastic ring 500 and making the elastic ring 500 deform, so as to prevent the light permeable liquid 200 from flowing out of the space S.

In the foregoing embodiment, because the light permeable liquid 200 and the light guide plate 300 are located above the reflective display panel 100, when the light source 400 provides a light to the light guide plate 300, the light guide plate 300 and the light permeable liquid 200 allow the light to travel into the reflective display panel 100 uniformly, thereby clearly displaying the image.

Moreover, because the holding device 600 holds the reflective display panel 100 and the light guide plate 300, the reflective display panel 100 and the light guide plate 300 can press against the elastic ring 500 along directions toward each other, thereby making the elastic ring 500 deform. Further, because the elastic ring 500 is elastic, when the elastic ring 500 is pressed and deformed, the elastic ring 500 exerts the reaction forces on the reflective display 100 and the light guide plate 300 along opposite directions, so that the elastic ring 500 can tightly press against the reflective display panel 100 and the light guide plate 300, thereby preventing the light permeable liquid 200 from flowing out of the space S.

In particular, in some embodiments, the holding device 600 includes a first pressing part 610, a second pressing part 620 and a connecting part 630. The connecting part 630 is connected between the first pressing part 610 and the second pressing part 620. In other words, the first pressing part 610 extends from the bottom of the connecting part 630 toward the space under the reflective display panel 100, and the first pressing part 610 presses against the reflective display panel 100. The second pressing part 620 extends from the top of the connecting part 630 toward the space above the light guide plate 300. The second pressing part 620 presses against the light guide plate 300. In some embodiments, the holding device 600 is elastic, but is not limited to be the one-piece-formed structure as shown in the figure. The holding device 600 can be, but is not limited to be, a clip, such as a crocodile clip.

Particularly, the reflective display panel 100 has a display surface 110 and a rear surface 120 opposite to each other. The light guide plate 300 has a bottom surface 310 and a top surface 320 opposite to each other. The light permeable liquid 200 and the elastic ring 500 are sandwiched between the bottom surface 310 of the light guide plate 300 and the display surface 110 of the reflective display panel 100. The first pressing part 610 presses against the rear surface 120 of the reflective display panel 100, and the second pressing part 620 presses against the top surface 320 of the light guide plate 300. As a result, the holding device 600 can press against the display panel 100 and the light guide plate 300, thereby pressing against the elastic ring 500 to make it deform.

In some embodiments, the space S is filled with the light permeable liquid 200. In other words, the light permeable liquid 200 contacts with the inner side of the elastic ring 500, the display surface 110 of the reflective display panel 100, and the bottom surface 310 of the light guide plate 300. The light permeable liquid 200 can not only make uniform light distribution, but also can act as the buffer material between the reflective display panel 100 and the light guide plate 300, which can prevent the large-sized reflective display panel 100 and light guide plate 300 from bending due to the large size, and can prevent the large-sized reflective display panel 100 from colliding with the light guide plate 300.

In order to provide the buffer ability to the reflective display panel 100 and the light guide plate 300 under various situations, in some embodiments, a freezing point of the light permeable liquid 200 ranges from −50° C. to 0° C. In other words, the freezing point of the light permeable liquid 200 can be lower than the ambient temperature under normal situations. Therefore, when the reflective display apparatus is operated under a normal situation, the light permeable liquid 200 can remain in the liquid state and is not solidified, which can provide the buffer ability to the reflective display panel and the light guide plate 300. It is understood that "the light permeable liquid 200 having the freezing point ranges from −50° C. to 0° C." refers to the material in which the freezing point can be 0° C., −50° C. or any value lower than 0° C. and higher than −50° C.

In some embodiments, the light permeable liquid 200 is an inviscid fluid. The light permeable liquid 200 has extremely low or no viscosity, so the manufacturer can easily inject the light permeable liquid 200 into the space S. When the reflective display panel 100 is a large-sized panel (such as a panel larger than 10 inch), the extremely low viscosity can significantly assist the manufacturer to inject the light permeable liquid 200, thereby improving the efficiency to manufacture the reflective display apparatus. Furthermore, because the light permeable liquid 200 is inviscid fluid, the user can pour the original light permeable liquid 200 out of the reflective display apparatus and inject new light permeable liquid 200 into the reflective display apparatus. Therefore, the user can replace the light permeable liquid 200, and this replaceability allows the user to choose a light permeable liquid 200 having a favored color. For example, the user can inject blue, red or green light permeable liquid 200 into the space S to show different display effects.

In some embodiments, the light permeable liquid 200 is an aqueous solution having alcohol-based compound. The aqueous solution having alcohol-based compound is an inviscid fluid, therefore the freezing point thereof is low (namely, the freezing point ranges from −50° C. to 0° C.), and this aqueous solution having alcohol-based compound not only keeps the solution in a liquid state under normal conditions for providing a buffer ability, but also facilitates an ability for the manufacturer to inject it and replace it. For example, the material of the light permeable liquid 200 may include, but is not limited to include, an alcohol-based compound, an antifoaming agent and water. More particularly, the material of the light permeable liquid 200 can be, but is not limited to be, an ethylene glycol aqueous solution, a propylene glycol aqueous solution, a polyethylene glycol aqueous solution or a polypropylene glycol aqueous solution.

In some embodiments, the light guide plate 300 includes a lateral surface 330. The lateral surface 330 is connected between the bottom surface 310 and the top surface 320. The light source 400 is disposed on the lateral surface 330. Therefore, the light source 400 can emit light toward the lateral surface 330 of the light guide plate 300. After the light is emitted into the light guide plate 300 through the lateral surface 330, it travels between the top surface 320 and the bottom surface 310 in a total reflection manner, so that the light can uniformly travel downwardly into the reflective display panel 100 through the bottom surface 310, thereby clearly showing an image. It is understood that although the light source 400 is disposed on the lateral surface 330 in this figure, but in other embodiments, the light source 400 can also be disposed on other locations (such as the top surface 320) as long as the light can travel into the light guide plate 300 and can travel between the top surface 320 and the bottom surface 310 in a total reflective manner.

In some embodiments, the reflective display panel 100 is a bistable display panel. For example, the reflective display panel 100 can be an electrophoretic display panel. In particular, the reflective display panel 100 includes a plurality of microcapsules. Each of the microcapsules has light-colored charged particles and dark-colored charged particles. The light-colored charged particle and the dark-colored charged particle have charges in different types, so that they can be controlled by an electric field. The light-colored charged particles reflect a light, and the dark-colored charged particles absorb a light. As a result, the user can see a gray scale image. In some embodiments, the reflective display panel 100 further includes a color filter for showing a colored image.

Figure 2:
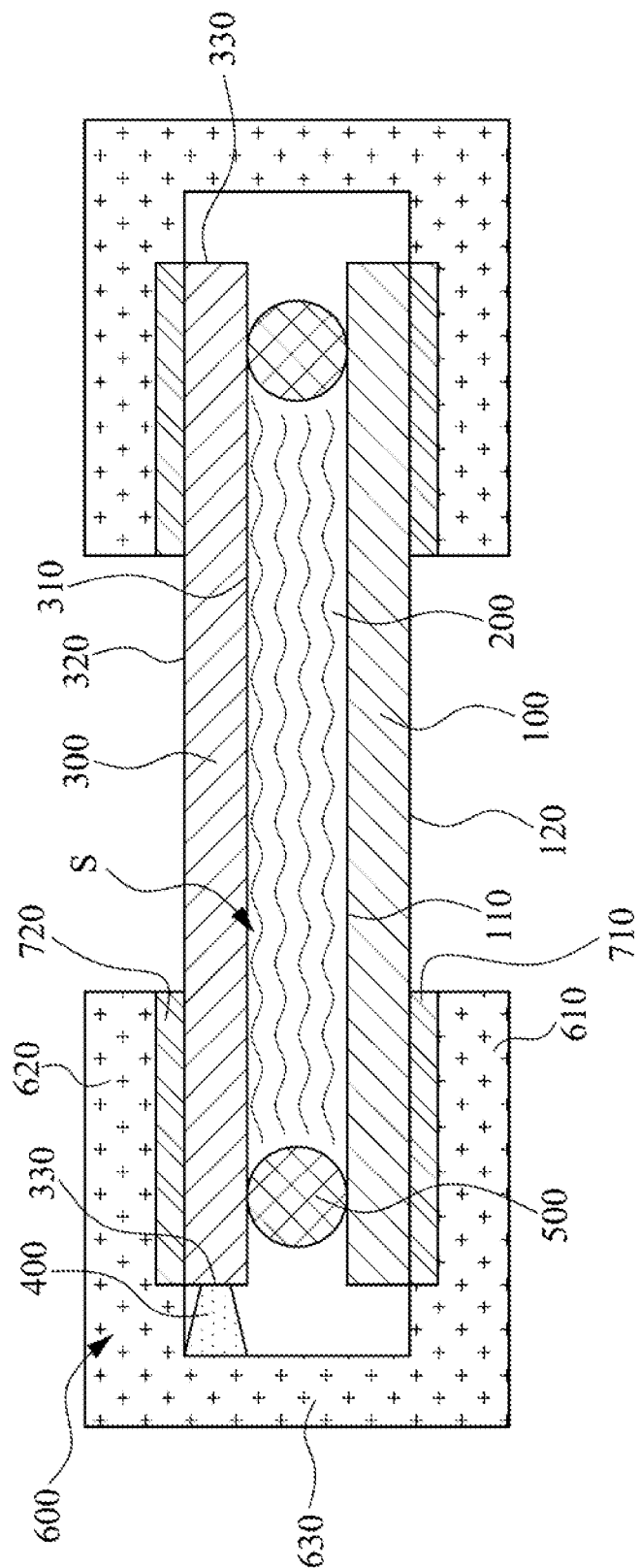
FIG. 2 is a schematic cross-sectional view of a reflective display apparatus in accordance with another embodiment of the present invention.

FIG. 2 is a schematic cross-sectional view of a reflective display apparatus in accordance with another embodiment of the present invention. As shown in FIG. 2, the main difference between this embodiment and the embodiment shown in FIG. 1 is that: the reflective display apparatus in this embodiment further includes a first buffer structure 710 and a second buffer structure 720. The first buffer structure 710 is sandwiched between the holding device 600 and the reflective display panel 100. The second buffer structure 720 is sandwiched between the holding device 600 and the light guide plate 300. In particular, the first buffer structure 710 is sandwiched between the first pressing part 610 and the rear surface 120 of the reflective display panel 100, so as to space the first pressing part 610 and the reflective display panel 100 apart. The second buffer structure 720 is sandwiched between the second pressing part 620 and the top surface 320 of the light guide plate 300, so as to space the second pressing part 620 and the light guide plate 300 apart. In some embodiments, the hardness of the first buffer structure 710 is lower than the hardness of the holding device 600, and the hardness of the second buffer structure 720 is also lower than the hardness of the holding device 600.

As a result, when the first pressing part 610 presses against the reflective display panel 100, the first buffer structure 710 prevents the relatively hard first pressing part 610 from contacting with the reflective display panel 100 and damaging the reflective display panel 100. Similarly, when the second pressing part 620 presses against the light guide plate 300, the second buffer structure 720 prevents the relatively hard second pressing part 620 from contacting with the light guide plate 300 and damaging the light guide plate 300. Therefore, when the holding device 600 holds the reflective display panel 100 and the light guide plate 300, the first buffer structure 710 and the second buffer structure 720 can respectively protect the reflective display panel 100 and the light guide plate 300. In other words, the holding device 600 can exert a high enough force to hold the reflective display panel 100 and the light guide plate 300, so as to tightly press against the elastic ring 500 and prevent the light permeable liquid 200 from escaping without damaging the reflective display panel 100 and the light guide plate 300.

For example, the material of the holding device 600 may be, but is not limited to be, metal. The material of the first buffer structure 710 and the material of the second buffer structure 720 may be, but is not limited to be, rubber or plastic having a hardness lower than the hardness of metal. In some embodiments, as long as the first buffer structure 710 and the second buffer structure 720 can respectively prevent the reflective display panel 100 and the light guide plate 300 from being damaged, the first buffer structure 710 and the second buffer structure 720 can have a hardness higher than the hardness of the holding device 600. For example, the material of the holding device 600 may be aluminum, and the material of the first buffer structure 710 and the material of the second buffer structure 720 can be a steel sheet having a hardness higher than the hardness of aluminum.

Figure 3:
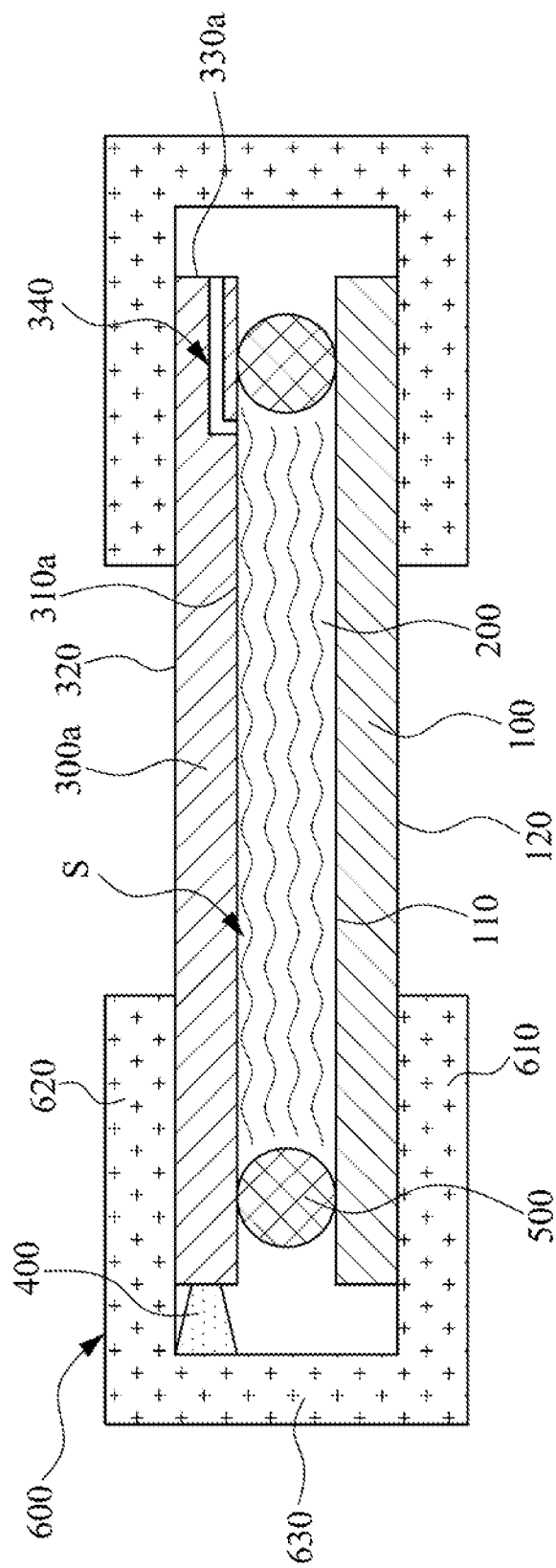
FIG. 3 is a schematic cross-sectional view of a reflective display apparatus in accordance with another embodiment of the present invention.

FIG. 3 is a schematic cross-sectional view of a reflective display apparatus in accordance with another embodiment of the present invention. As shown in FIG. 3, the main difference between this embodiment and the embodiment shown in FIG. 1 is that: the light guide plate 300a has a liquid injection channel 340. The liquid injection channel 340 is in spatial communication with the space S. Therefore, the manufacturer can inject the light permeable liquid 200 into the space S through the liquid injection channel 340. In particular, two opposite openings of the liquid injection channel 340 are respectively formed on the bottom surface 310a and the lateral surface 330a of the light guide plate 300a, so the light permeable liquid 200 can be injected into the liquid injection channel 340 via the opening formed on the lateral surface 330a of the light guide plate 300a, and the injected light permeable liquid 200 can flow into the space S via the opening formed on the bottom surface 310a of the light guide plate 300a. In some embodiments, when the space S is filled with the light permeable liquid 200, the opening formed on the lateral surface 330a of the light guide plate 300a can be sealed, so as to prevent the light permeable liquid 200 from flowing out of the space S and the liquid injection channel 340 via opening formed on the lateral surface 330a.

Figure 4:
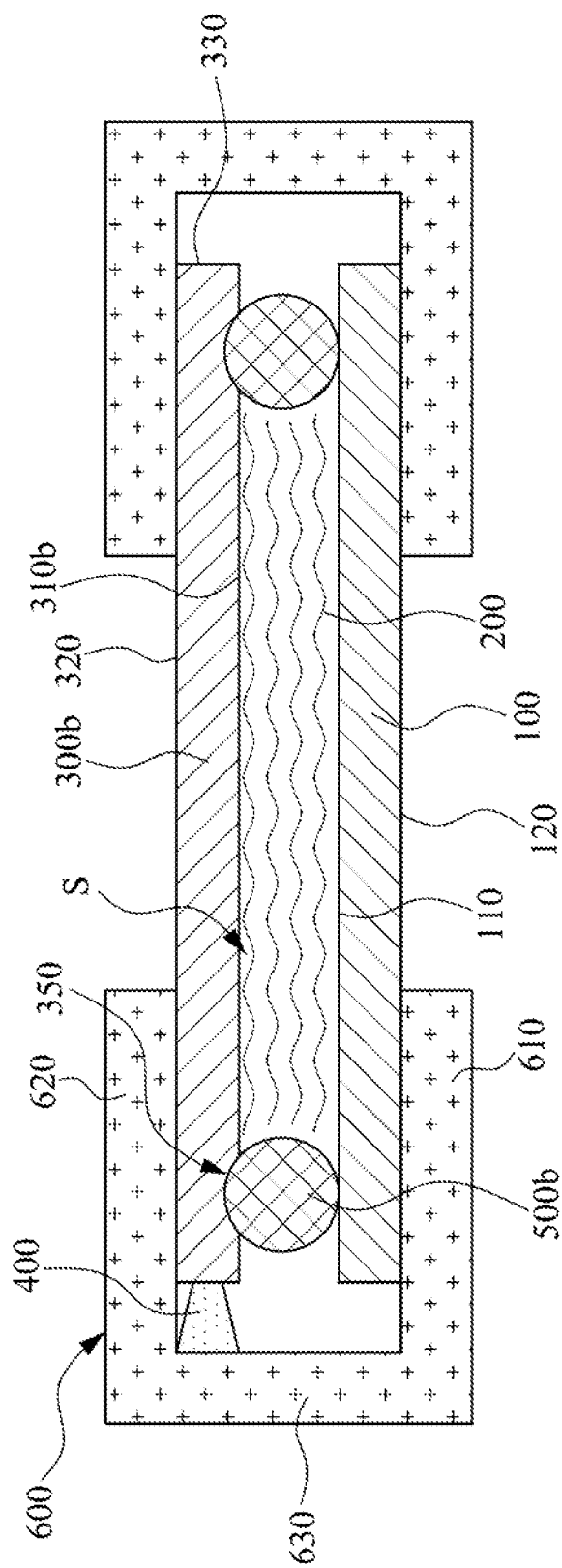
FIG. 4 is a schematic cross-sectional view of a reflective display apparatus in accordance with another embodiment of the present invention.

FIG. 4 is a schematic cross-sectional view of a reflective display apparatus in accordance with another embodiment of the present invention. As shown in FIG. 4, the main difference between this embodiment and the embodiment shown in FIG. 1 is that: the light guide plate 300b has an annular trench 350. The annular trench 350 is caved in the bottom surface 310b. The elastic ring 500b is partially disposed in the annular trench 350. The elastic ring 500b and the annular trench 350 are fitted in an interference fitting connection. In other words, a part of the elastic ring 500b can be pressed and deformed by the inner wall of the annular trench 350, so that the part of the elastic ring 500b can be secured in the annular trench 350. In other words, a partial surface of the elastic ring 500b is in tight contact with the inner wall of the annular trench 350, and another partial surface of the elastic ring 500b is located out of the annular trench 350 and between the reflective display panel 100 and the light guide plate 300.

Therefore, the elastic ring 500b is not only pressed and secured by the reflective display panel 100 and the light guide plate 300b, but also secured by the annular trench 350. Therefore, in this embodiment, the elastic ring 500b can be located between the reflective display panel 100 and the light guide plate 300b more stably.

Moreover, because the elastic ring 500b and the annular trench 350 are fitted in an interference fitting connection, a gap between the elastic ring 500b and the inner wall of the annular trench 350 can be effectively reduced, thereby preventing the light permeable liquid 200 from flowing out of the space S.

Figure 5:
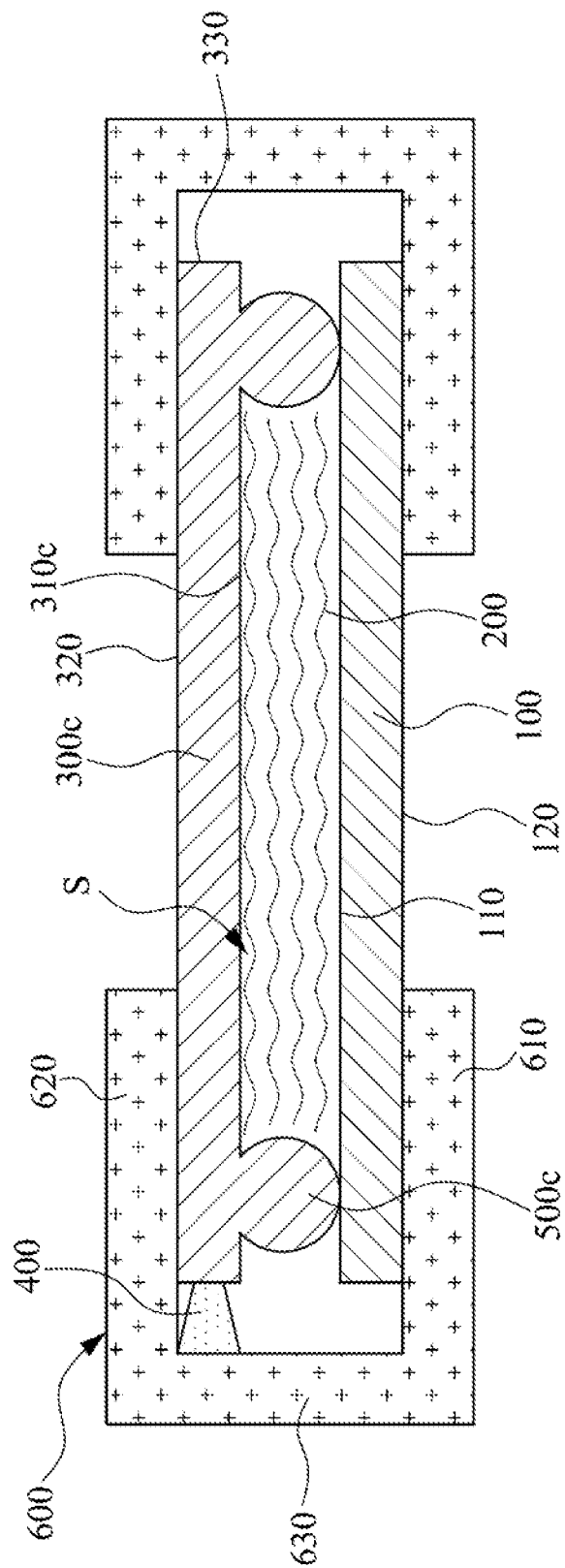

FIG. 5 is a schematic cross-sectional view of a reflective display apparatus in accordance with another embodiment of the present invention. As shown in FIG. 5, the main difference between this embodiment and the embodiment shown in FIG. 1 is that: in this embodiment, the elastic ring 500c and the light guide plate 300c are integrally formed. In other words, the elastic ring 500c is protruded from the bottom surface 310c of the light guide plate 300c, so as to effectively reduce the gap between the elastic ting 500c and the light guide plate 300c, thereby preventing the light permeable liquid 200 from flowing out of the space S.

The elastic ring 500c and the light guide plate 300c are preferably made of an elastic material, so that when the elastic ring 500c and the light guide plate 300c are integrally formed, the elastic ring 500c has resilience, which enables the elastic ring 500c to tightly press against the reflective display panel 100 when the elastic ring 500c is pressed and deformed by the reflective display panel 100.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A reflective display apparatus, comprising:
   a reflective display panel;
   a light guide plate;
   an elastic ring sandwiched between the reflective display panel and the light guide plate, the elastic ring spacing the reflective display panel and the light guide plate apart and defining a space between the reflective display panel and the light guide plate, wherein the light guide plate has a trench, and wherein the elastic ring and the trench are fitted in an interference fitting connection;

a light permeable liquid located in the space; and a holding device holding the reflective display panel and the light guide plate, thereby pressing against the elastic ring and making the elastic ring deform.

2. The reflective display apparatus of claim 1, wherein a freezing point of the light permeable liquid ranges from −50° C. to 0° C.

3. The reflective display apparatus of claim 1, wherein the light permeable liquid is an inviscid fluid.

4. The reflective display apparatus of claim 1, wherein a material of the light permeable liquid is an ethylene glycol aqueous solution, a propylene glycol aqueous solution, a polyethylene glycol aqueous solution or a polypropylene glycol aqueous solution.

5. The reflective display apparatus of claim 1, wherein a material of the light permeable liquid comprises an alcohol-based compound, an antifoaming agent and water.

6. The reflective display apparatus of claim 1, further comprising a first buffer structure sandwiched between the holding device and the reflective display panel.

7. The reflective display apparatus of claim 1, further comprising a second buffer structure sandwiched between the holding device and the light guide plate.

8. The reflective display apparatus of claim 1, wherein the trench is an annular trench.

9. The reflective display apparatus of claim 1, wherein the light guide plate has a liquid injection channel being in spatially communication with the space.

10. The reflective display apparatus of claim 1, further comprising a light source located between the holding device and the light guide plate.

* * * * *